US011218069B2

(12) United States Patent
Yamamoto et al.

(10) Patent No.: US 11,218,069 B2
(45) Date of Patent: Jan. 4, 2022

(54) POWER CONVERSION DEVICE

(71) Applicants: TOSHIBA MITSUBISHI-ELECTRIC INDUSTRIAL SYSTEMS CORPORATION, Chuo-ku (JP); NATIONAL UNIVERSITY CORPORATION HOKKAIDO UNIVERSITY, Sapporo (JP)

(72) Inventors: Yushin Yamamoto, Chuo-ku (JP); Satoshi Ogasawara, Sapporo (JP); Shunsuke Ohara, Sapporo (JP)

(73) Assignees: TOSHIBA MITSUBISHI-ELECTRIC INDUSTRIAL SYSTEMS CORPORATION, Chuo-ku (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 0 days.

(21) Appl. No.: 17/265,022

(22) PCT Filed: Mar. 7, 2019

(86) PCT No.: PCT/JP2019/009163
§ 371 (c)(1),
(2) Date: Feb. 1, 2021

(87) PCT Pub. No.: WO2020/179064
PCT Pub. Date: Sep. 10, 2020

(65) Prior Publication Data

US 2021/0313873 A1 Oct. 7, 2021

(51) Int. Cl.

| | |
|---|---|
| ***H02M 1/12*** | (2006.01) |
| ***H02M 7/5395*** | (2006.01) |
| ***H02M 7/48*** | (2007.01) |

(52) U.S. Cl.
CPC ........... *H02M 1/123* (2021.05); *H02M 1/126* (2013.01); *H02M 7/4803* (2021.05); *H02M 7/5395* (2013.01)

(58) Field of Classification Search
CPC .. H02M 7/4803; H02M 7/5395; H02M 1/123; H02M 1/126; H02P 27/08
See application file for complete search history.

(56) References Cited

U.S. PATENT DOCUMENTS 5,831,842 A * 11/1998 Ogasawara ............. H02M 1/12 363/40
9,130,542 B1 * 9/2015 Ishihara ............... H03H 11/126
(Continued)

FOREIGN PATENT DOCUMENTS

JP 11-295264 A 10/1999
JP 2001-268322 A 9/2001
(Continued)

OTHER PUBLICATIONS

International Search Report dated May 7, 2019 In PCT/JP2019/009163, 2 pages.
(Continued)

*Primary Examiner* — Jue Zhang
(74) *Attorney, Agent, or Firm* — Oblon, McClelland, Maier & Neustadt, L.L.P.

(57) ABSTRACT

A power conversion device, including: a voltage detector that detects a common mode voltage generated upon a switching operation of a power semiconductor device; a voltage superimposer that superimposes the common mode voltage detected by the voltage detector onto an output of the power conversion device to cancel the common mode voltage having a frequency greater than or equal to a switching frequency generated upon the switching operation of the power semiconductor device; and a residual voltage detector that detects the common mode voltage of the power con-
(Continued)

version device superimposed by the voltage superimposer. The voltage superimposer includes a feedback mechanism for adding and superimposing the common mode voltage detected by the residual voltage detector onto the output of the power conversion device. The voltage detector includes a first choke coil and a first capacitor.

6 Claims, 14 Drawing Sheets

(56) References Cited

U.S. PATENT DOCUMENTS

| | | | | |
|---|---|---|---|---|
| 9,270,159 | B2 * | 2/2016 | Shen | H02M 1/12 |
| 2017/0047881 | A1 * | 2/2017 | Shimura | H02P 29/50 |
| 2018/0278176 | A1 * | 9/2018 | Ogasawara | H02P 27/08 |

FOREIGN PATENT DOCUMENTS

| | | | |
|---|---|---|---|
| JP | 2008-236817 | A | 10/2008 |
| WO | WO 2017/077939 | A1 | 5/2017 |

OTHER PUBLICATIONS

Written Opinion of the International Searching Authority dated May 7, 2019 in PCT/JP2019/009163 (with English translation), 9 pages.
Japanese Office Action dated Sep. 8, 2020 in Japanese Patent Application No. 2019-541372 (with unedited computer generated English translation), 8 pages.

* cited by examiner

COMMON MODE EQUIVALENT CIRCUIT $R_{line}$ : POWER SUPPLY IMPEDANCE TO GROUND
$L_{d\_leak}$ : NONZERO CHOKE LEAKAGE INDUCTANCE
$L_{mc}$ : MOTOR COMMON MODE INDUCTANCE
$C_{mc}$ : MOTOR COMMON MODE CAPACITANCE

POWER CONVERSION DEVICE

TECHNICAL FIELD

The present invention relates to a power conversion device and a scheme for cancelling a common mode voltage generated during power conversion that is based on a switching operation of a power semiconductor device represented by, for example, an inverter.

BACKGROUND ART

In recent years, for power conversion devices such as voltage-type PWM inverters which performs operative control of, for example, a motor as a load, carrier frequencies of the voltage-type PWM inverters are increased with an expansion of the range of applications of power conversion devices and enhanced characteristics of the power semiconductor devices.

However, electromagnetic interference (EMI) generated by the voltage-type PWM inverters is a growing concern with a higher frequency of the voltage-type PWM inverters.

The source of the electromagnetic interference generated by voltage-type PWM inverters, primarily, arises from a current flowing through a ground conductor.

In this respect, Japanese Patent Laying-Open No. 2001-268922 proposes a scheme in which the common mode voltage of the inverter output is suppressed using coils to reduce leakage current.

CITATION LIST

Patent Literature

PTL 1: Japanese Patent Laying-Open No. 2001-268922

SUMMARY OF INVENTION

Technical Problem

However, a problem with the technology disclosed in the above patent literature is low attenuation of the output common mode voltage due to the effect of the leakage inductance of the coils.

The present invention is made to solve problems as the above, and an object of the present invention is to provide a power conversion device which achieves enhanced attenuation of the common mode voltage.

Solution to Problem

A power conversion device for causing a power semiconductor device to perform a switching operation for power conversion according to a certain aspect of the present disclosure, the power conversion device comprising: a voltage detection means that detects a common mode voltage generated upon the switching operation of the power semiconductor device; a voltage superimposing means that superimposes the common mode voltage detected by the voltage detection means on an output of the power conversion device to cancel the common mode voltage having a frequency greater than or equal to a switching frequency generated upon the switching operation of the power semiconductor device; and a residual voltage detection means that detects the common mode voltage of the power conversion device superimposed by the voltage superimposing means. The voltage superimposing means includes a feedback means for adding and superimposing the common mode voltage detected by the residual voltage detection means onto the output of the power conversion device. The voltage detection means includes a first choke coil and a first capacitor.

Preferably, the power conversion device further includes a damper for reducing effects of resonance based on a leakage inductance of the first choke coil.

Preferably, the damper includes a second choke coil and a resistor.

Preferably, the damper further includes a second capacitor. The resistor and the second capacitor form a high-frequency cut filter.

Preferably, the voltage detection means further includes a fast detection circuit that detects a high-frequency component of the common mode voltage.

Preferably, the residual voltage detection means a detection capacitor that detects a common mode voltage remained in each phase of the output of the power conversion device; and a detection resistor connected in series to the detection capacitor.

Advantageous Effects of Invention

The power conversion device according to the present invention allows for enhanced attenuation of an output common mode voltage.

DESCRIPTION OF EMBODIMENTS

Figure 1:
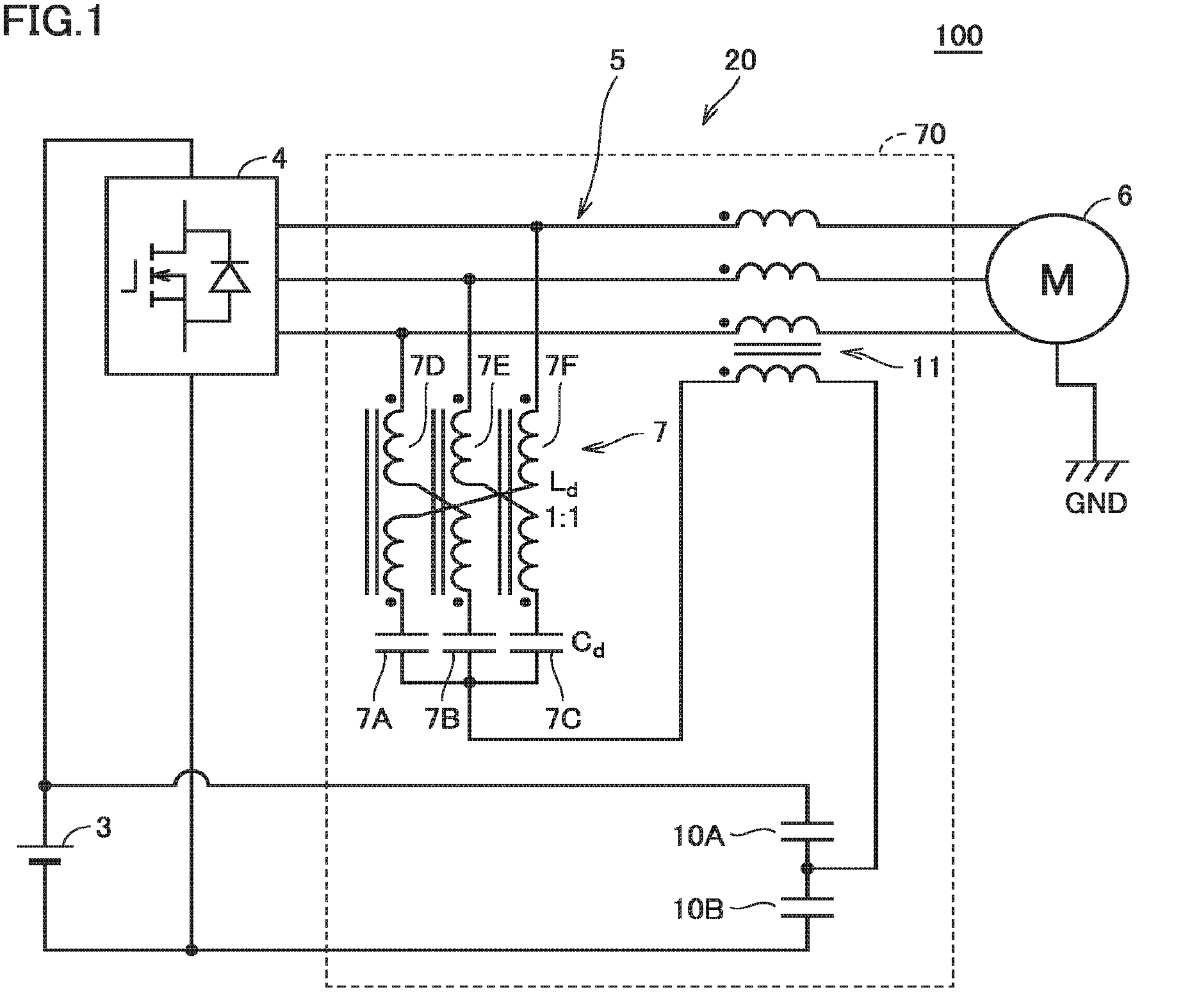
FIG. 1 is a diagram for illustrating a configuration of a motor control system 100 according to Comparative Example.

Embodiments will be described in detail, with reference to the accompanying drawings. Note that the same reference sign is used to refer to the same or corresponding component in the drawings, and description thereof will not be repeated.

Hereinafter, embodiments according to the present invention will be described, with reference to the accompanying drawings.

COMPARATIVE EXAMPLE

FIG. 1 is a diagram for illustrating a configuration of a motor control system 100 according to Comparative Example.

Referring to FIG. 1, motor control system 100 includes an alternating-current (AC) motor 6 and a power conversion device 20.

Power conversion device 20 includes a voltage-type PWM inverter 4, and a common-mode suppression circuit 70 for suppressing a common mode voltage.

Voltage-type PWM inverter 4 (also simply referred to as an inverter) is connected to a DC power supply 3, and converts a direct-current (DC) voltage into a three-phase AC voltage by a switching operation of a power semiconductor device (IGBT, MOSFET, etc.).

The AC voltage obtained by the conversion by inverter 4 is supplied to AC motor (motor) 6 via three-phase cables 5, and a frame of AC motor 6 is connected to a ground voltage GND via a ground conductor.

Common-mode suppression circuit 70 is disposed between inverter 4 and AC motor (motor) 6.

Common-mode suppression circuit 70 includes: common mode voltage sensing circuit 7 which is connected to three-phase AC output terminals of inverter 4 in a star configuration and detects the common mode voltage; a common mode transformer 11 which includes a primary-side coil for receiving a common mode voltage, and secondary-side coils on three-phase cables 5; and capacitors 10A, 10B.

Common mode voltage sensing circuit 7 includes capacitors 7A, 7B, and 7C, and choke coils 7D, 7E, and 7F. Choke coils 7D to 7F are connected to three-phase cables 5 between common mode transformer 11 and inverter 4. Choke coils 7D to 7F form nonzero-phase choke coils. Capacitors 7A to 7C are connected in series to choke coils 7D to 7F, respectively.

Capacitors 7A to 7C are connected in a star configuration, and connected to one side of the primary-side coil included in common mode transformer 11.

Capacitors 10A, 10B are connected in series to DC power supply 3, and a connection node NA between capacitors 10*a*, 10*b* is connected to the other side of the primary-side coil included in common mode transformer 11.

Common mode voltage sensing circuit 7 has an output terminal connected to the primarily side of common mode transformer 11, and superimposes onto a common mode voltage having an opposite phase to the common mode voltage, according to the excitation inductance of common mode transformer 11. This is a scheme for cancelling the common mode voltage.

In contrast, common mode voltage sensing circuit 7 is, in fact, formed of choke coils, and generates leakage inductance. Due to the leakage inductance, the coupling rate of the common mode transformer is degraded, and the common mode voltage may not be suppressed sufficiently.

Embodiment 1

Figure 2:
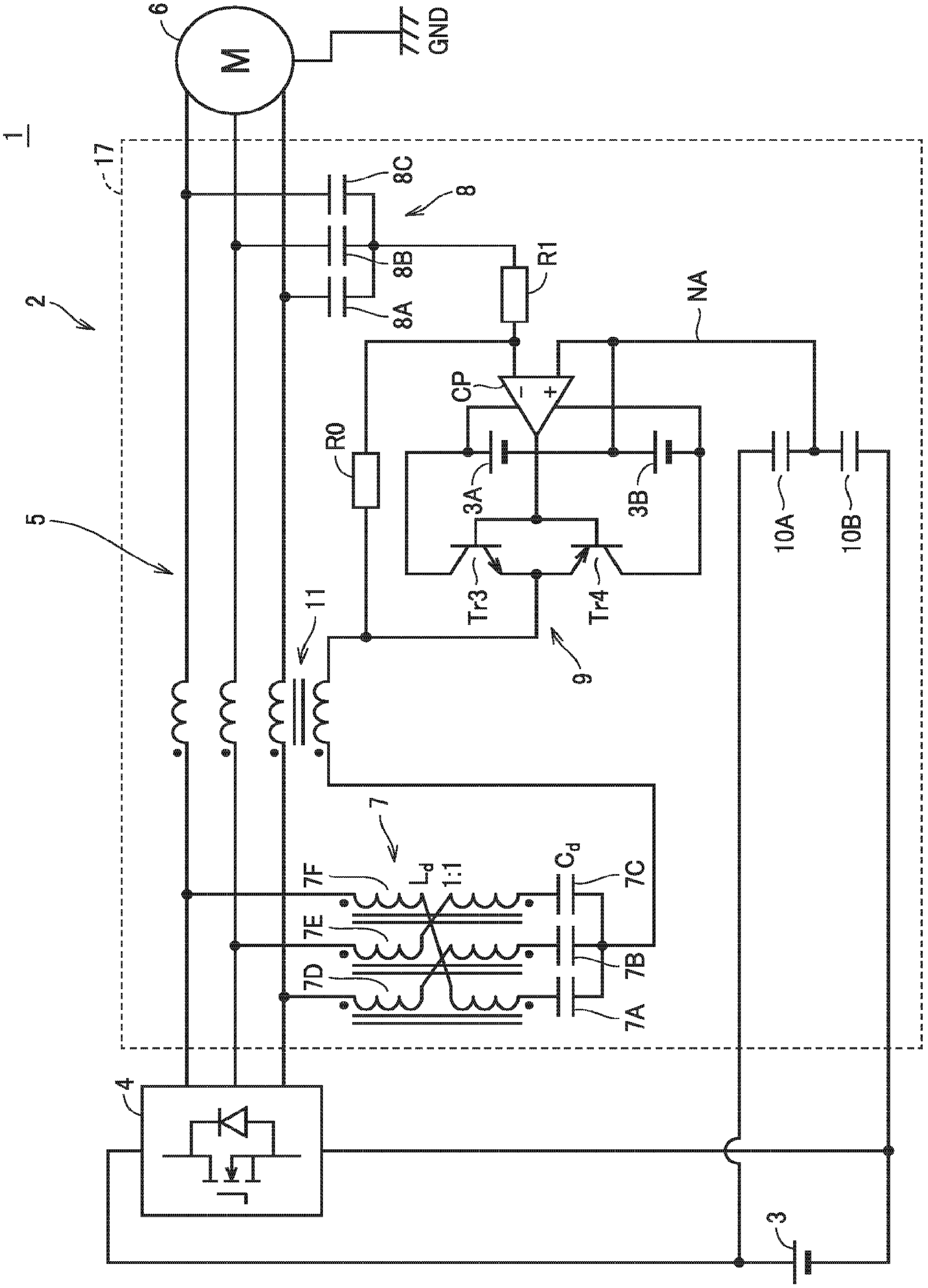
FIG. 2 is a diagram for illustrating a configuration of a motor control system 1 according to Embodiment 1.

FIG. 2 is a diagram for illustrating a configuration of a motor control system 1 according to Embodiment 1.

Referring to FIG. 2, motor control system 1 includes an AC motor 6, and a power conversion device 2 according to the present invention. Note that the AC motor includes both inductor motors and synchronous motors.

Power conversion device 2 includes a voltage-type PWM inverter 4, and a common-mode suppression circuit 17 for suppressing a common mode voltage.

Compared to power conversion device 20, power conversion device 2 is the same, except for including common-mode suppression circuit 17, instead of common-mode suppression circuit 70.

Common-mode suppression circuit 17 includes: a common mode voltage sensing circuit 7 which is connected to three-phase AC output terminals of inverter 4 in a star configuration, and detects a common mode voltage; common mode transformer 11 which includes a primary-side coil for receiving the common mode voltage and secondary-side coils on three-phase cables 5; a residual common mode voltage sensing circuit 8; and a feedback circuit 9.

Common mode voltage sensing circuit 7 includes capacitors 7A, 7B, and 7C, and choke coils 7D, 7E, and 7F. Choke coils 7D to 7F are connected to three-phase cables 5 between common mode transformer 11 and inverter 4. Choke coils 7D to 7F form nonzero-phase choke coils. Capacitors 7A to 7C are connected in series to choke coils 7D to 7F, respectively.

Capacitors 7A to 7C are connected in a star configuration, and connect to one side of the primary-side coil included in common mode transformer 11.

Residual common mode voltage sensing circuit 8 includes capacitors 8A to 8C which are connected, in a star configuration, to three-phase cables 5 between common mode transformer 11 and AC motor 6, and detect a residual common mode voltage.

Feedback circuit 9 further includes an operational amplifier CP, resistors R0, R1, a push-pull emitter follower circuit using a complementary transistor for power amplification, capacitors 10A, 10B, and DC power supplies 3A, 3B.

The emitter follower circuit includes bipolar transistors Tr3, Tr4 which are connected in series to DC power supplies 3A, 3B, and whose bases are connected to an output of operational amplifier CP.

While this example will be described, with reference to providing the emitter follower circuit (bipolar transistors Tr3, Tr4) to amplify the possible output current of operational amplifier CP, it should be noted that the emitter follower circuit may not be provided.

Capacitors 10A, 10B are connected in series to DC power supply 3, and a connection node NA between capacitors 10A, 10B is connected to one (positive) input of operational amplifier CP. Connection node NA is also connected to a connection node between DC power supplies 3A, 3B.

Operational amplifier CP has the other (negative) input connected to residual common mode voltage sensing circuit 8 via resistor R1. A resistor R0 is disposed between the other (negative) input of operational amplifier CP and an output of the emitter follower circuit.

Figure 3:
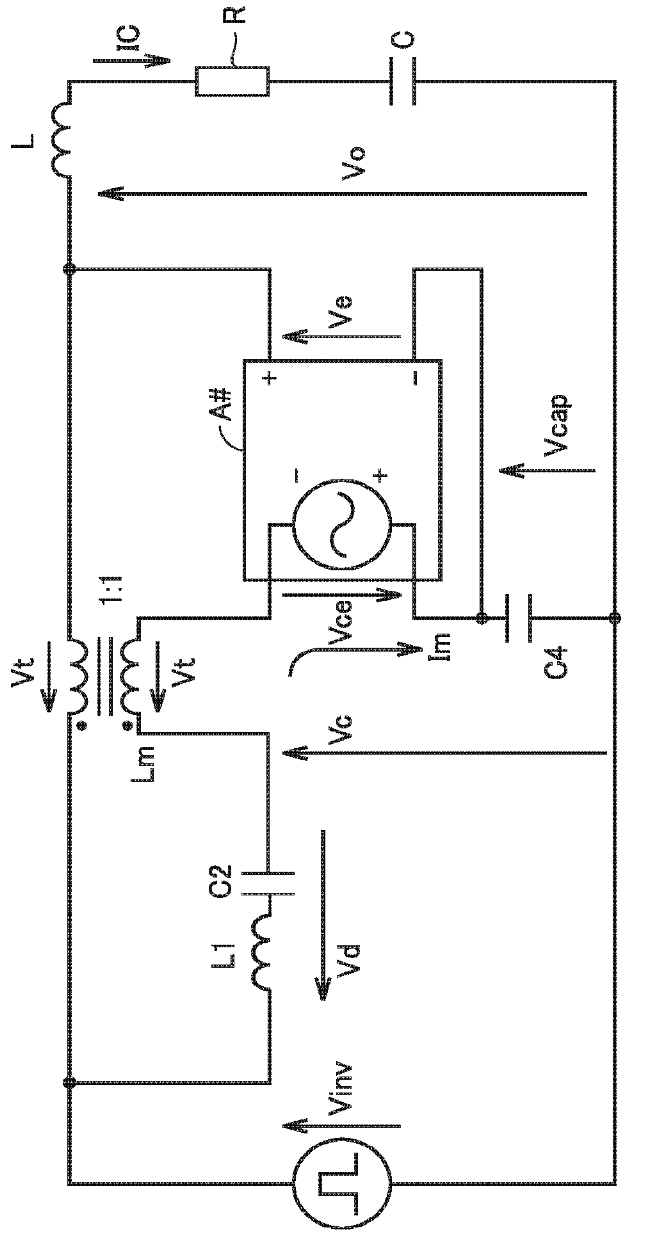
FIG. 3 is a diagram for illustrating an equivalent circuit for a common mode of a common-mode suppression circuit 17, according to Embodiment 1.

FIG. 3 is a diagram for illustrating an equivalent circuit for a common mode of common-mode suppression circuit 17 according to Embodiment 1.

Referring to FIG. 3, capacitance C represents a stray capacitance between the winding and frame of the motor, inductance L represents inductance of the entire path line, and resistor R represents the resistive component of the entire path line. The excitation inductance $L_m$, the transformer having a turns ratio of 1:1 is common mode transformer 11 in which the leakage inductance is ignored.

Common mode voltage sensing circuit 7 is represented by: leakage inductance L1 of the nonzero-phase choke coil; and capacitance C2 which is the sum of capacitors 7A, 7B, and 7C.

Feedback circuit 9 can be represented by a voltage-controlled power supply A# which receives voltage Ve and outputs voltage Vce.

Voltage Vinv is a common mode voltage of the inverter output. Current Im is an excitation current of the common mode transformer. Current Ic is a common mode current flowing through the motor. Voltage Vo is a common mode voltage after the common mode voltage is suppressed.

As one phase of inverter 4 is switched, common mode voltage Vinv output from inverter 4 changes in a stepwise manner.

Every time the inverter 4 is switched, output zero-phase voltage of inverter 4, that is, the common mode voltage changes in a stepwise manner. This causes a common mode current Ic to flow to a ground conductor through the stray capacitance between the winding and frame of AC motor (motor) 6.

Common mode voltage Vinv contains zero-phase voltage component Vlow and voltage Vhi which has a component of frequency greater than or equal to the switching frequency.

Accordingly, the following Equation (1) stands.

$$Vinv = Vlow + Vhi \tag{1}$$

Excitation inductance Lm, a combined capacitance C4 of capacitors 10A, 10B, and combined capacitance C2 which is the sum of capacitors 7A, 7B, and 7C, form a resonance circuit.

Resonance frequency f is represented by the following Equation (2).

[MATH 1]

Where $$C = \frac{C2C4}{C2 + C4},$$

resonance frequency $$f = \frac{1}{2\pi\sqrt{LmC}} \tag{2}$$

Voltage Vc detected by common mode voltage sensing circuit 7 contains error voltage Vd resulting from the leakage inductance L1, and is represented by the following Equation (3) using Equation (1).

$$Vc = Vinv + Vd = Vlow + Vhi + Vd \tag{3}$$

According to output Vce of voltage-controlled power supply A#, the following Equation (4) is met in the equivalent circuit.

$$Vt = Vc + Vce - Vcap \tag{4}$$

Output Vce of voltage-controlled power supply A# compensates for the error voltage resulting from the leakage inductance.

Most of the common mode voltage is compensated for by voltage Vc, and thus the amplitude of voltage Vce is sufficiently small, as compared to the amplitude of voltage Vc. Thus, the influence of voltage Vce is negligible, and excitation current Im is defined mostly by voltage Vc.

For this reason, if resonance frequency f is set to fall between the zero-phase voltage frequency and the switching frequency, the following Equation (5) is met, in which voltage Vcap is the zero-phase voltage component Vlow.

$$Vcap = Vlow \tag{5}$$

The suppressed common mode voltage Vo is represented by the following Equation (6), using Equation (1), Equation (3), Equation (4), and Equation (5) above.

$$Vo = Vinv - Vt = (Vlow + Vhi) - (Vc + Vce - Vcap) = (Vlow + Vhi) - ((Vlow + Vhi + Vd) + Vce - (Vlow)) = Vlow - Vd - Vce \tag{6}$$

Input Ve of voltage-controlled power supply A# is represented by the following Equation (7), using Equation (5).

$$Ve = Vo - Vcap = Vo - Vlow \tag{7}$$

In other words, input Ve is obtained by removing the zero-phase voltage component from common mode voltage Vo.

Input and output voltages of voltage-controlled power supply A# are represent by Equation (8).

$$Vce = GVe \tag{8}$$

When gain G is sufficiently large, Ve is zero due to an imaginary short.

Accordingly, the following Equation (9) is met, using Equation (7).

$$\text{From } Ve = 0 = Vo - Vlow,\ Vo = Vlow \tag{9}$$

Vce at this time is represented by the following Equation (10), using Equation (6).

$$\text{From } Vo = Vlow = Vlow - Vd - Vce,\ Vce = -Vd \tag{10}$$

Only the zero-phase voltage component remains in common mode voltage Vo.

Voltage-controlled power supply A# operates using the zero-phase voltage component as a reference potential, and input/output only a residual component that has a small amplitude.

Due to the resonant circuit formed of excitation inductance Lm, capacitance C2 which is the sum of capacitors 7A, 7B, and 7C, and combined capacitance C4 of capacitors 10A, 10B, the potential of node NA, which is the mid-point of the power supply and a reference point for the amplification of the operational amplifier, is equal to zero-phase voltage Vlow of the inverter.

The residual common mode voltage detected at capacitors 8A to 8C of residual common mode voltage sensing circuit 8 is inverted amplified by operational amplifier CP, and added to common mode transformer 11.

These operations result in performing a feedback control so that the common mode voltage applied to an inverter load is equal to the zero-phase voltage of the inverter, and only the component of frequency higher than or equal to the switching frequency in the common mode voltage of the inverter output, is cancelled.

The operating reference point (ground) for the operational amplifier for use in the feedback control is set to the zero-phase voltage of an output common mode voltage of the inverter, thereby allowing for the use of a lower breakdown, high-speed, inexpensive operational amplifier.

EXAMPLE

Evaluations of attenuation characteristics of the common mode voltages of the inverters according to Comparative Example and Embodiment 1 will be described.

The supply voltage of the inverter is 600 V and the switching frequency is 100 kHz. Note that no load is connected to AC motor (motor) 6. Gain G is set to 10.

Figure 4:
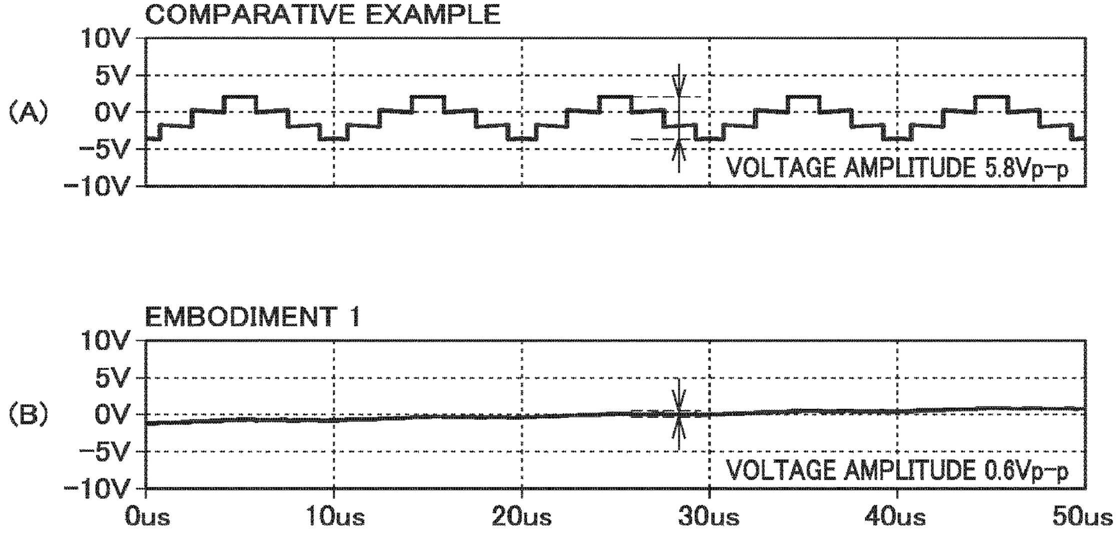
FIG. 4 shows diagrams for illustrating waveforms of common mode voltages.

FIG. 4 shows diagrams for illustrating waveforms of common mode voltages.

FIG. 4 (A) of shows a common mode voltage suppressed by common-mode suppression circuit 70 according to Comparative Example.

FIG. 4 (B) shows a common mode voltage suppressed by common-mode suppression circuit 17 according to Embodiment 1.

Note that the reference potential is a neutral point of the inverter power supply.

As shown in the configuration, the amplitude of about 5.8 V, shown in FIG. 4 (A), can be reduced to the amplitude of about 0.6 V in FIG. 4 (B).

Figure 5:
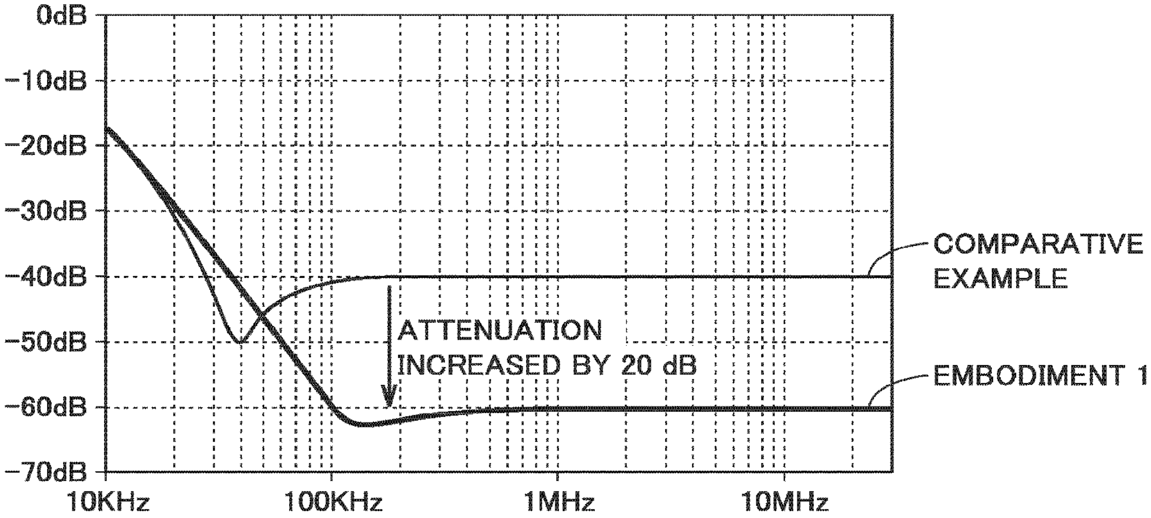
FIG. 5 is a diagram for illustrating attenuations of the common mode voltages.

FIG. 5 is a diagram for illustrating attenuations of the common mode voltages.

As shown in FIG. 5, the attenuation at 100 kHz is 40 dB according to the configuration of Comparative Example, but is 60 dB according to the configuration of Embodiment 1. An increase in attenuation by 20 dB is observed.

As apparent from the figure, it can be seen that the use of the common-mode suppression circuit according to Embodiment 1 is very effective in suppressing the common mode voltage and reducing the common mode current.

Embodiment 2

Embodiment 2 will be described with respect to a highly accurate common-mode suppression circuit.

While Embodiment 1 has been described with reference to the scheme for suppressing the influence of the coupling rate of common mode transformer 11 resulting from the leakage inductance of the choke coils included in common mode voltage sensing circuit 7.

In contrast, the leakage inductance of common mode voltage sensing circuit 7 may cause a resonance frequency in relation with AC motor 6.

Figure 6:
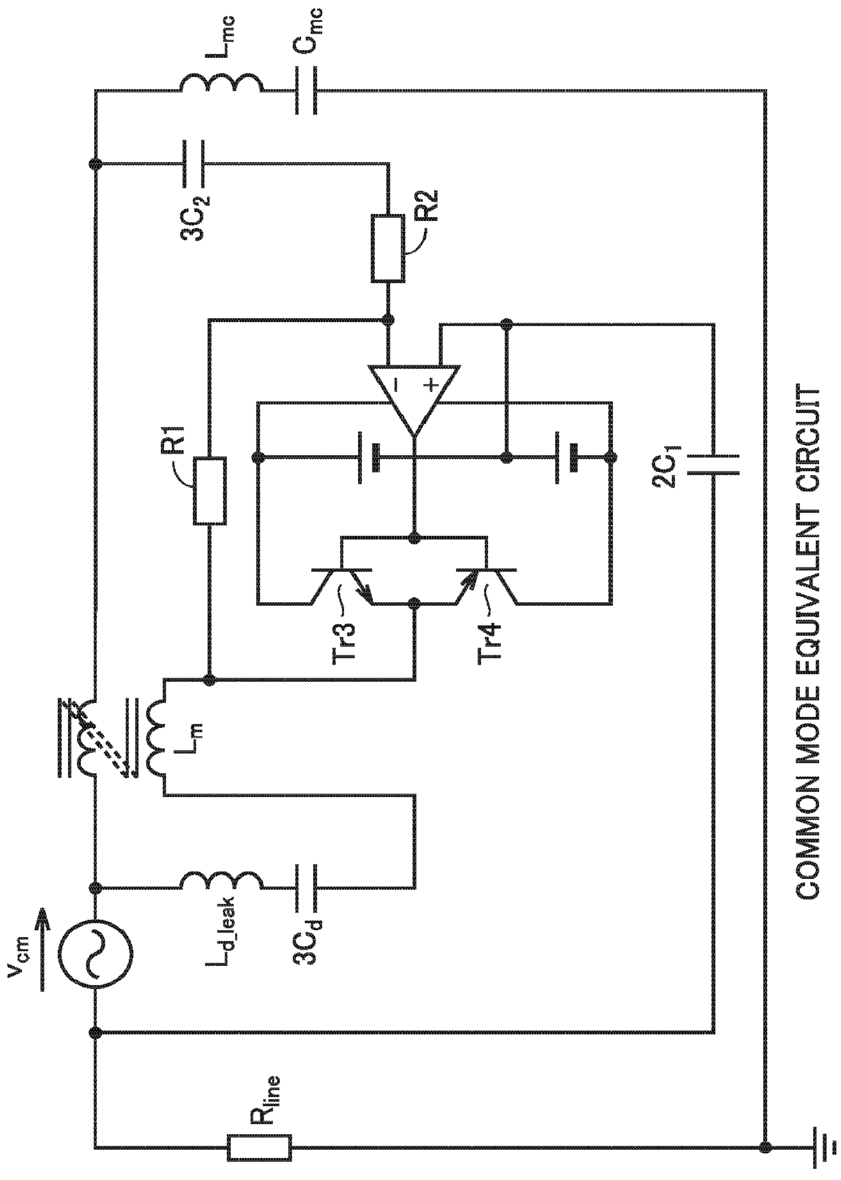
FIG. 6 is another diagram for illustrating the equivalent circuit for the common mode of common-mode suppression circuit 17 according to Embodiment 1.

FIG. 6 is another diagram for illustrating the equivalent circuit for the common mode of common-mode suppression circuit 17 according to Embodiment 1.

As shown in FIG. 6, the equivalent circuit is provided with leakage inductance $L_{d\_leak}$ k of the choke coils included in common mode voltage sensing circuit 7, and motor common mode inductance $L_{mc}$ and a motor common mode capacitance $C_{mc}$ of AC motor (motor) 6.

Resonance frequency based on these is calculated by the following Equation (11).

[MATH 2]

$$\text{Resonance frequency } fr = \frac{1}{2\pi\sqrt{(L_{d\_leak} + L_{mc})C_{mc}}} \tag{11}$$

Figure 7:
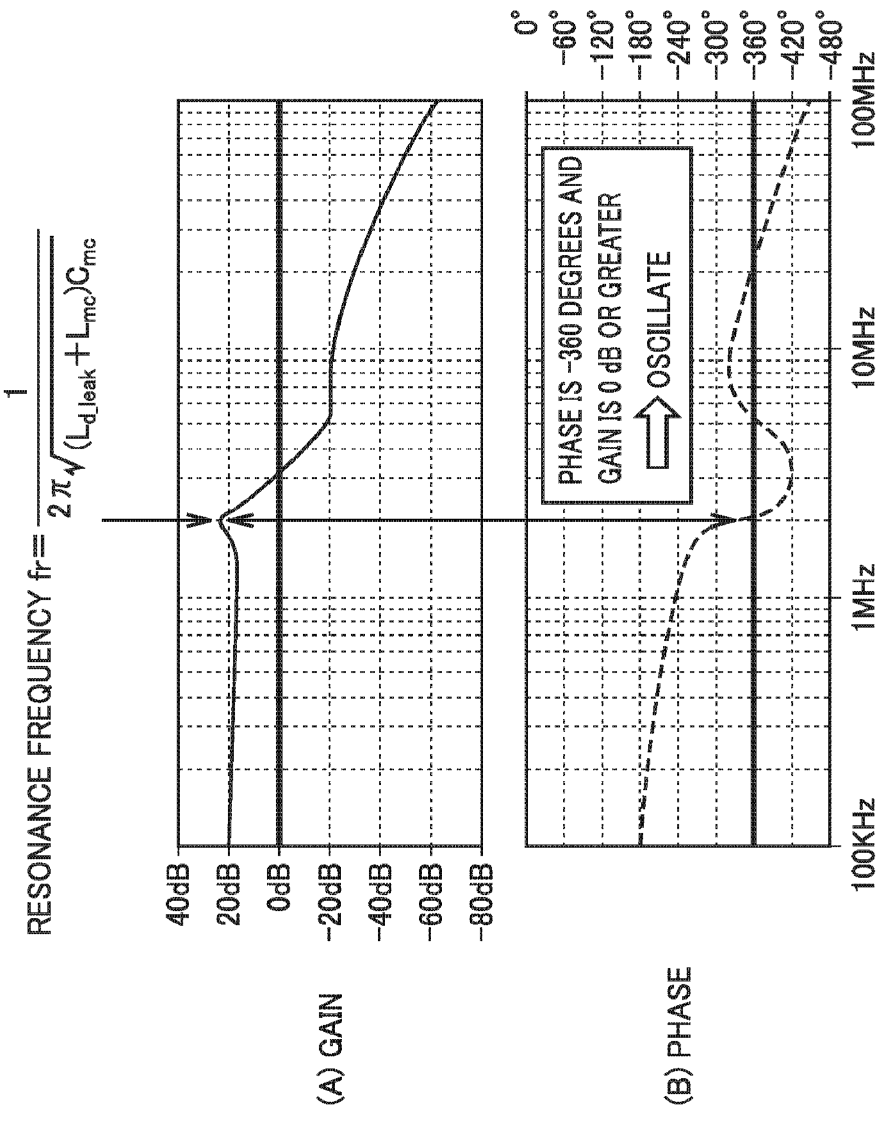
FIG. 7 is a diagram for illustrating the gain and phase of an open-loop transfer function.

FIG. 7 is a diagram for illustrating the gain and phase of an open-loop transfer function.

As shown in FIG. 7, oscillation occurs when the phase is −360 degrees and the gain is 0 dB or higher. In this example, oscillation may occur because the gain is 20 dB or higher.

This oscillation may be a source of noise on feedback circuit 9, making it difficult for residual common mode voltage sensing circuit 8 to accurately detect the residual common mode voltage.

Figure 8:
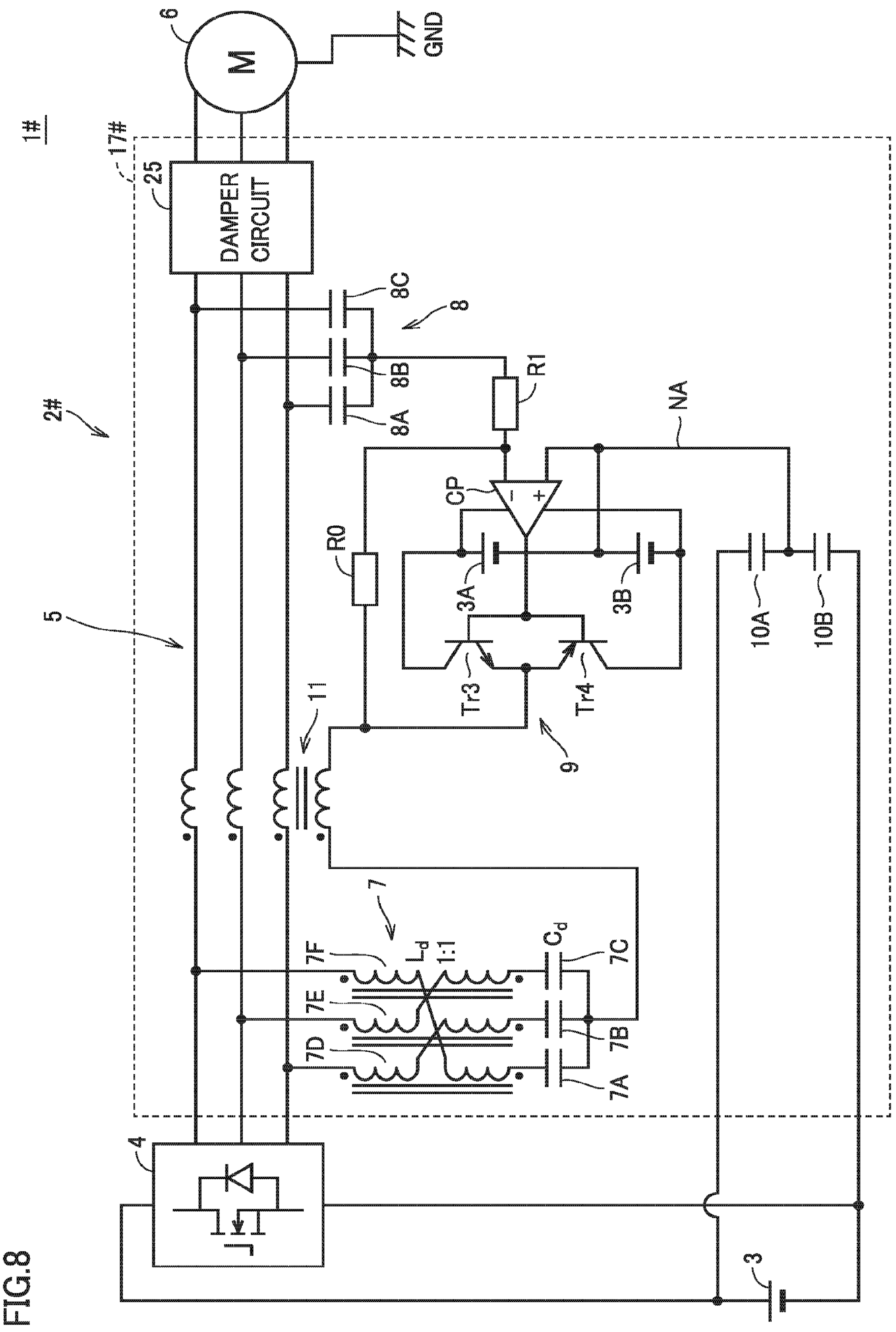
FIG. 8 is a diagram for illustrating a configuration of a motor control system 1# according to Embodiment 2.

FIG. 8 is a diagram for illustrating a configuration of a motor control system 1# according to Embodiment 2.

Referring to FIG. 8, compared to motor control system 1, motor control system 1# is the same, except for including a power conversion device 2#, instead of power conversion device 2. Compared to power conversion device 2, power conversion device 2# is the same, except for including a common-mode suppression circuit 17#, instead of common-mode suppression circuit 17. Compared to common-mode suppression circuit 17, common-mode suppression circuit 17# is the same, except for further including a damper circuit 25.

Damper circuit 25 is disposed between common mode transformer 11 and AC motor (motor) 6. Note that damper circuit 25 may be disclosed between inverter 4 and common mode transformer 11. Alternatively, damper circuit 25 may be provided at the earlier stage of inverter 4.

Figure 9:
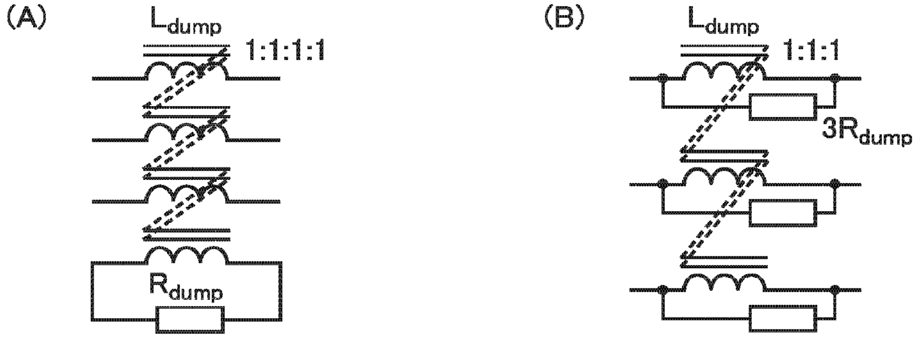
FIG. 9 shows diagrams for illustrating configurations of damper circuits according to Embodiment 2.

FIG. 9 shows diagram for illustrating configurations of the damper circuits according to Embodiment 2.

Referring to FIG. 9 (A), an example of four-phase common mode choke coils is shown. The turns ratio of the four is 1:1:1:1. One damper resistor is connected to a fourth winding. The reactance of the choke coil is $L_{dump}$, and the resistance of the damper resistor is $R_{dump}$.

Referring to FIG. 9 (B), an example of three-phase common mode choke coils is shown. The turns ratio of the three is 1:1:1. One damper resistor is provided for each winding. The damper resistor is connected in parallel with the winding.

Figure 10:
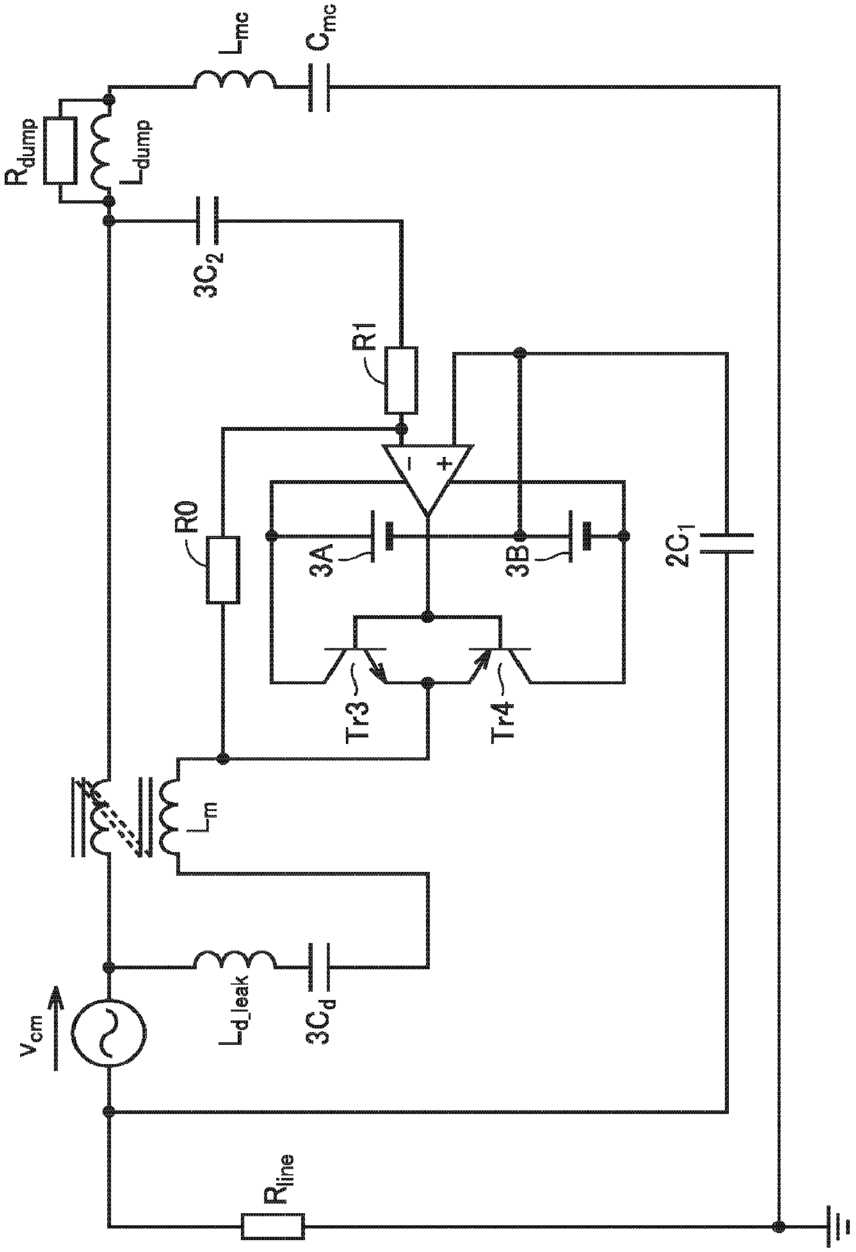
FIG. 10 is a diagram for illustrating an equivalent circuit for a common mode of a common-mode suppression circuit 17# according to Embodiment 2.

FIG. 10 is a diagram for illustrating an equivalent circuit for the common mode of a common-mode suppression circuit 17# according to Embodiment 2.

As shown in FIG. 10, in the equivalent circuit, reactance $L_{dump}$ and damper resistance $R_{dump}$ by damper circuit 25 are connected in parallel, between common mode transformer 11 and AC motor (motor) 6.

Figure 11:
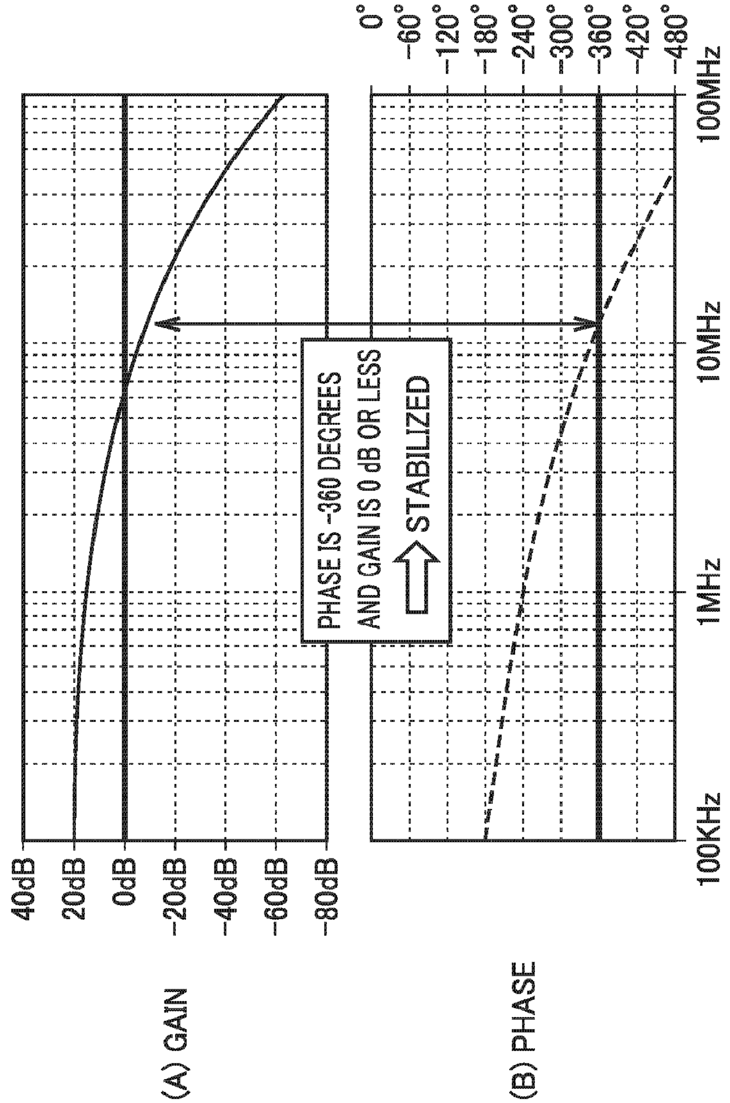
FIG. 11 is a diagram for illustrating the gain and phase of a resonance frequency after insertion of a damper circuit 25.

FIG. 11 is a diagram for illustrating the gain and phase of the resonance frequency after insertion of damper circuit 25.

As shown in FIG. 11, oscillation occurs when the phase is −360 degrees and the gain is 0 dB or higher. In this example, the oscillation can be suppressed because the gain is less than 0 dB. The resonance frequency can be lowered and changes in phase caused by the resonance can be alleviated by damper circuit 25.

Note that, as one example, reactance $L_{dump}$ of damper circuit 25 is 300 μH, and damper resistance $R_{dump}$ is 1 kΩ. Gain G is set to 10. Leakage inductance $L_{d\_leak}$ of the choke coils included in common mode voltage sensing circuit 7 is 10 μH, the motor common mode inductance Line of AC motor (motor) 6 is 1 μH, and the motor common mode capacitance $C_{mc}$ is 500 pF. A simulation of the motor control system 1# is performed.

This allows reduction in effects of the resonance resulting from the leakage inductance of common mode voltage sensing circuit 7, thereby allowing for implementation of a highly accurate common-mode suppression circuit.

Embodiment 3

Embodiment 3 will be described with respect to a more accurate common-mode suppression circuit.

Embodiment 2 has been described with reference to the scheme for suppressing the resonance frequency resulting from the leakage inductance of common mode voltage sensing circuit 7.

In contrast, common mode voltage sensing circuit 7 detects a common mode voltage, using choke coils.

Figure 12:
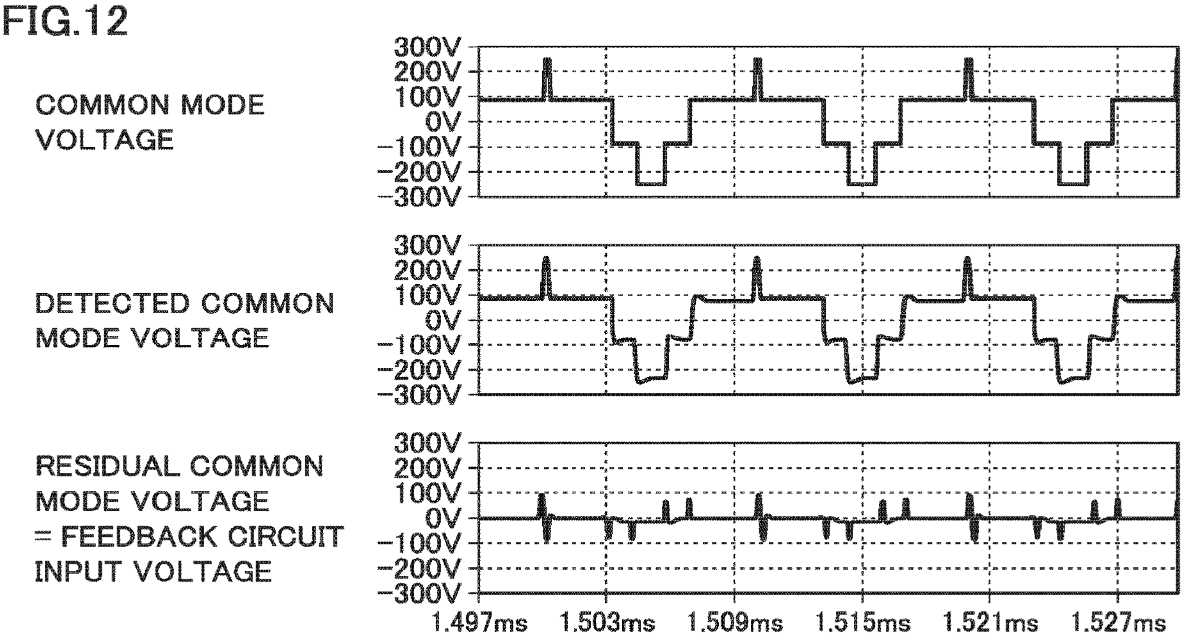
FIG. 12 shows diagrams for illustrating detection of the common mode voltage of common mode voltage sensing circuit 7.

FIG. 12 shows diagrams for illustrating detection of the common mode voltage of common mode voltage sensing circuit 7.

As shown in FIG. 12, common mode voltage sensing circuit 7 detects a common mode voltage output from an inverter 4. In contrast, inverter 4 is a fast switching device (as one example, the switching time is about 100 ns). Choke coils included in common mode voltage sensing circuit 7 struggle to follow abrupt voltage changes, and thus may be a cause of residual common mode voltage.

Figure 13:
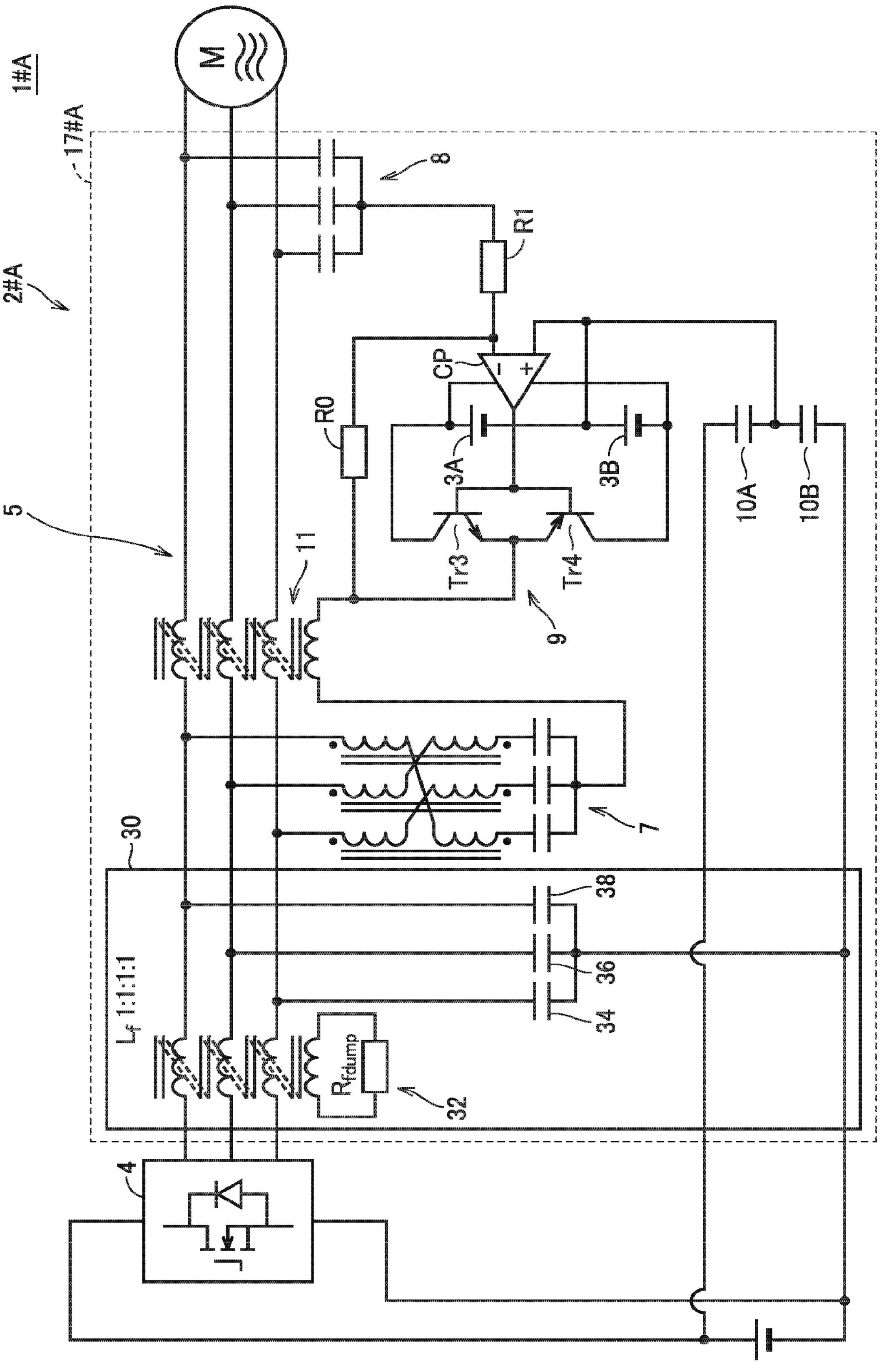
FIG. 13 is a diagram for illustrating a configuration of a motor control system 1#A according to Embodiment 3.

FIG. 13 is a diagram for illustrating a configuration of a motor control system 1#A according to Embodiment 3.

Referring to FIG. 13, compared to motor control system 1#, motor control system 1#A according to Embodiment 3 is the same, except for including a power conversion device 2#A, instead of power conversion device 2#. Compared to power conversion device 2#, power conversion device 2#A is the same, except for including a common-mode suppression circuit 17#A, instead of common-mode suppression circuit 17#. Compared to common-mode suppression circuit 17#, common-mode suppression circuit 17#A is the same, except for including a filter circuit 30 between inverter 4 and common mode transformer 11.

Filter circuit 30 includes a damper circuit 32 and capacitors 34, 36, and 38.

Damper circuit 32 is the same as damper circuit 25 described with reference to Embodiment 2.

Capacitors 34, 36, and 38 each have one side connected to a respective phase and the other sides of capacitors 34, 36, and 38 are connected in a star configuration, and connected to a ground.

Filter circuit 30 attenuates a high-frequency component. Specifically, filter circuit 30 attenuates only high-frequency components that are a few hundreds of kHz higher than the common mode voltage. Filter circuit 30 suppresses abrupt changes in waveform of the common mode voltage to decrease the slope (dV/dt).

This suppresses the common mode voltage having a high-frequency component output from inverter 4, to increase the detection accuracy of common mode voltage sensing circuit 7 and suppress the residual common mode voltage.

Moreover, filter circuit 30, since it includes the damper circuit, can reduce the resonance resulting from the leakage inductance of common mode voltage sensing circuit 7, as described with reference to Embodiment 2. In other words, a more accurate common-mode suppression circuit can be implemented.

While this example has been described with reference to providing damper circuit 32, it should be noted that damper circuit 25 according to Embodiment 2 may further be provided. Specifically, a first damper circuit may be disposed between inverter 4 and common mode transformer 11, and a second damper circuit may be disposed between common mode transformer 11 and AC motor (motor) 6. This allows for implementation of a more accurate common-mode suppression circuit.

Figure 14:
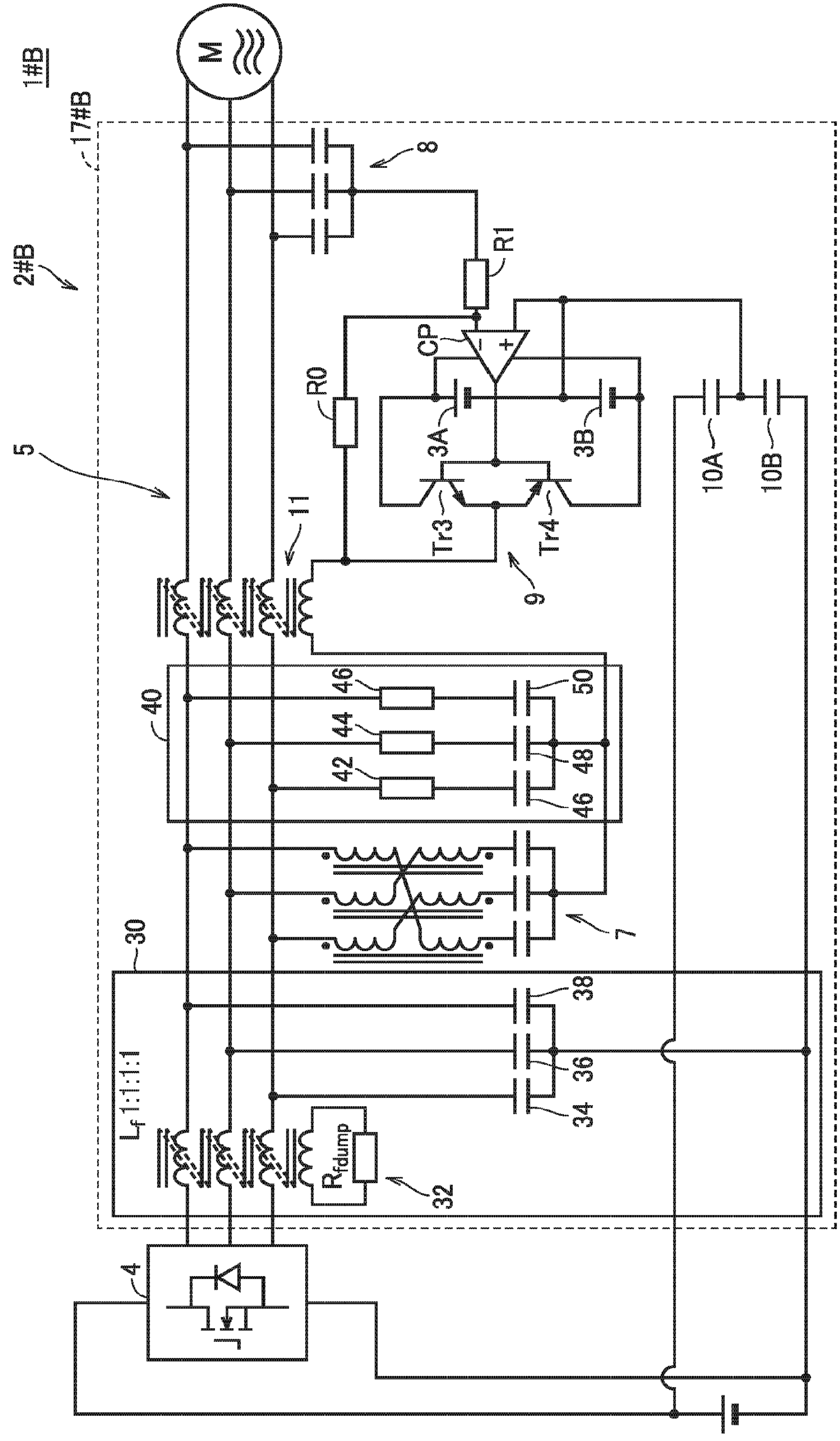
FIG. 14 is a diagram for illustrating a configuration of a motor control system 1#B according to a variation of Embodiment 3.

FIG. 14 is a diagram for illustrating a configuration of a motor control system 1#B according to a variation of Embodiment 3.

Referring to FIG. 14, compared to motor control system 1#A, motor control system 1#B according to the variation of Embodiment 3 is the same, except for including a power conversion device 2#B, instead of power conversion device 2#A. Compared to power conversion device 2#A, a power conversion device 2#B is the same, except for including a common-mode suppression circuit 17#B, instead of common-mode suppression circuit 17#A. Compared to common-mode suppression circuit 17#A, a common-mode suppression circuit 17#B is the same, except for including a fast detection circuit 40 between inverter 4 and common mode transformer 11.

Fast detection circuit 40 includes resisters 42, 44, 46, and capacitors 46, 48, 50.

Resisters 42, 44, 46 have one sides connected to respective phases and the other sides connected to capacitors 46, 48, 50, respectively. Capacitors 46, 48, 50 have one sides connected in series to resisters 42, 44, 46, respectively, and the other sides connected in a star configuration.

Fast detection circuit 40 is disposed in parallel with common mode voltage sensing circuit 7, and connected to the primary-side coil of common mode transformer 11.

Disposing fast detection circuit 40 in parallel with common mode voltage sensing circuit 7 as such allows fast detection circuit 40 to detect abrupt changes in common mode voltage output from inverter 4, allowing suppression of the residual common mode voltage. In other words, a more accurate common-mode suppression circuit can be implemented.

Embodiment 4

Figure 15:
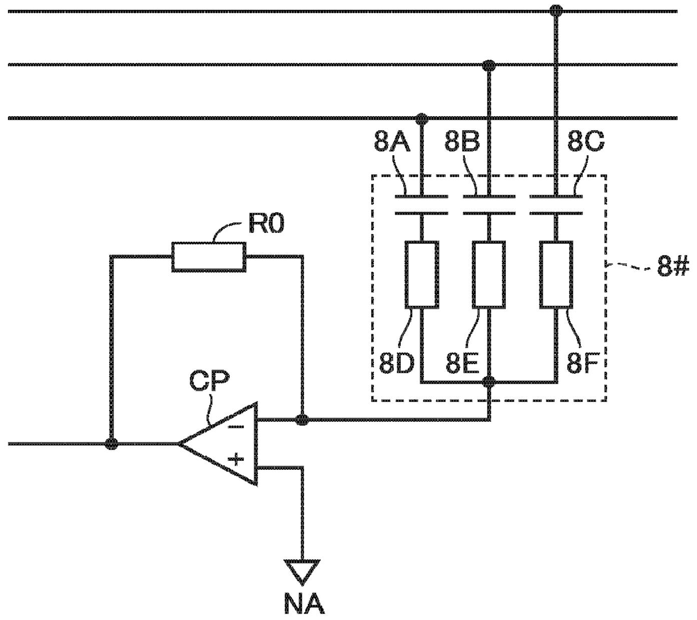
FIG. 15 is a diagram for illustrating a residual common mode voltage sensing circuit according to Embodiment 4.

FIG. 15 is a diagram for illustrating a residual common mode voltage sensing circuit according to Embodiment 4.

Referring to FIG. 15, compared to residual common mode voltage sensing circuit 8, a residual common mode voltage sensing circuit 8# according to Embodiment 4 is the same, except for further including resistors 8D, 8E, and 8F.

Resistor 8D is connected in series to capacitor 8A. Resistor 8E is connected in series to capacitor 8B. Resistor 8F is connected in series to capacitor 8C.

While Embodiment 1 has been described, with reference to including resistor R1 on the input side of operational amplifier CP, the resistor is provided on the residual common mode voltage sensing circuit 8# side.

Providing the resistors in series with the capacitors connected to the respective phases can suppress the current flowing through the capacitors.

The current flowing at changes in line voltage can be significantly reduced. Moreover, the suppression of the current can reduce the noise, thereby allowing for implementation of a more accurate common-mode suppression circuit.

The presently disclosed embodiments should be considered in all aspects as illustrative and not restrictive. The scope of the present invention is indicated by the appended claims, rather than by the above description, and all changes that come within the scope of the claims and the meaning and range of equivalency of the claims are intended to be embraced within their scope.

INDUSTRIAL APPLICABILITY

While the power conversion device which includes the voltage-type PWM inverter according to the present invention has been described with reference to applying the power conversion device to the motor control system in which an AC motor is operated, the power conversion device is also applicable as devices such as other power conversion device which generate the common mode voltage upon switching of a power semiconductor device, for example, DC-DC converters.

REFERENCE SIGNS LIST

1, 1# motor control system; 2, 2# power conversion device; 3, 3A, 3B DC power supply; 4 inverter; 5 three-phase cables; 6 AC motor; 7 common mode voltage sensing circuit; 8, 8# residual common mode voltage sensing circuit; 17, 17#, 17#A, 17#B common-mode suppression circuit; 10, 10A, 10B capacitor; 11 common mode transformer; and 25 damper circuit.

The invention claimed is:

1. A power conversion device for causing a power semiconductor device to perform a switching operation for power conversion, the power conversion device comprising:

a voltage detection means that detects a common mode voltage generated upon the switching operation of the power semiconductor device;

a voltage superimposing means that superimposes the common mode voltage detected by the voltage detection means on an output of the power conversion device to cancel the common mode voltage having a frequency greater than or equal to a switching frequency generated upon the switching operation of the power semiconductor device; and a residual voltage detection means that detects the common mode voltage of the power conversion device superimposed by the voltage superimposing means, wherein the voltage superimposing means includes a feedback means for adding and superimposing the common mode voltage detected by the residual voltage detection means onto the output of the power conversion device, and the voltage detection means includes a first choke coil and a first capacitor.

2. The power conversion device according to claim 1, further comprising a damper for reducing effects of resonance based on a leakage inductance of the first choke coil.

3. The power conversion device according to claim 2, wherein the damper includes a second choke coil and a resistor.

4. The power conversion device according to claim 3, wherein the damper further includes a second capacitor, and the resistor and the second capacitor form a high-frequency cut filter.

5. The power conversion device according to claim 1, wherein the voltage detection means further includes a fast detection circuit that detects a high-frequency component of the common mode voltage.

6. The power conversion device according to claim 1, wherein the residual voltage detection means includes:

a detection capacitor that detects a common mode voltage remained in each phase of the output of the power conversion device; and a detection resistor connected in series to the detection capacitor.

* * * * *